Figure 1:
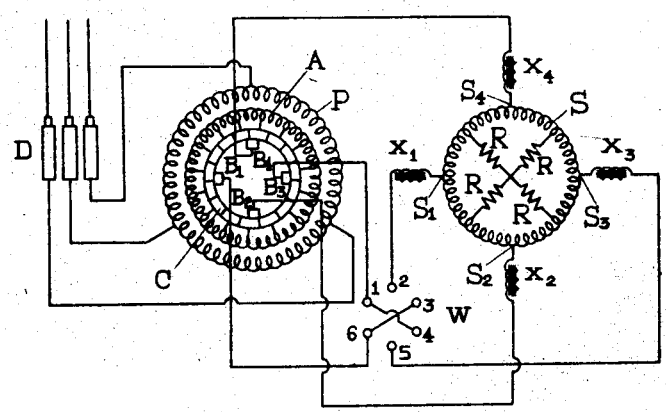

Aug. 24, 1926.

T. YAMAMOTO 1,597,228

COMPENSATED INDUCTION AND SYNCHRONOUS MOTOR

Filed March 24, 1925

Inventor:
Tadaoki Yamamoto
By Attys
Fraser, Myers & Manley.

Patented Aug. 24, 1926.

1,597,228

UNITED STATES PATENT OFFICE.

TADAOKI YAMAMOTO, OF TAKATA-MACHI, JAPAN.

COMPENSATED INDUCTION AND SYNCHRONOUS MOTOR.

Application filed March 24, 1925. Serial No. 17,953.

This invention relates to the improvements in compensated induction motors and method of synchronizing the same.

The object of my invention is to provide an induction motor of the compensated type with a starting resistance which gradually loses its current limiting property, leading to acceleration of the motor.

Having this object in view I connect a high starting resistance to the secondary winding to which also is connected an armature winding of direct current type supplying compensating currents to the said secondary winding through a commutator, brushes and high inductances. This latter circuit should preferably be connected midway between the points where the high starting resistances are connected.

At starting, the secondary power current, due to its high frequency, mainly flows through the starting resistances. As the speed increases and the secondary frequency diminishes, it is gradually shifted to the compensating circuit, flowing through the inductances. In this manner, the compensating circuit acts gradually and automatically to serve as a working circuit too, this operation being effected without any manipulation whatsoever, such as cutting out a starting rheostat.

This invention also comprises, as one of the most important applications, the special case where the secondary winding is connected in symmetrical quarter phase as shown in the drawing. In this case the junction points of the four phases are connected through high inductances to four brushes respectively which are situated 90 electrical degrees apart one from the other, so that the phase rotation of the E. M. F.'s in the secondary winding is the same as that of the compensating circuit. After starting as a compensated induction motor, it can, if desired, be converted into a synchronous motor by changing the connection of one of the two sets of the brushes which are oppositely situated or 180 electrical degrees apart, so that the sense of rotation of the compensating circuit is reversed. In this instance, after synchronization, one pair of the brushes serves to supply the exciting current, while the other will serve to supply a current to compensate the cross field due to the load current, whereby unity power factor will be maintained at all loads.

Figure 2:
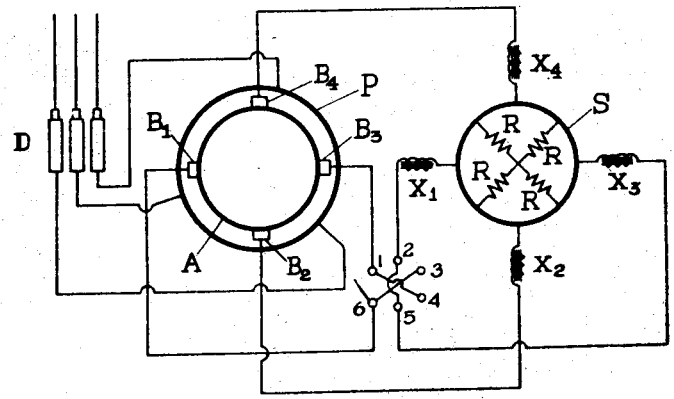

In the annexed drawing, Figure 1 is a diagrammatical representation of a compensated induction and synchronous motor according to this invention where, for the sake of simplicity, the machine is illustrated as having 2 pairs of poles. Figure 2 is a similar view, but more diagrammatically represented, of the motor wherein the connection is made for a synchronous operation thereof.

Referring to Figure 1, P is a primary winding provided on the rotor, to be connected to a source of alternating current through a set of slip rings D. A is a compensating armature winding of direct current type, also mounted on the rotor and provided with a commutator C. S is a secondary winding provided on the stator, of ring connection and forming a symmetrical quarter phase system. W is a reversing switch mounted at any suitable place of the stationary part of the machine.

The four junction points $S_1$, $S_2$, $S_3$, and $S_4$ are connected through respective inductances $X_1$, $X_2$, $X_3$, $X_4$ to the four equidistantly disposed brushes $B_1$, $B_2$, $B_3$ and $B_4$, the circuits containing inductances $X_1$ and $X_3$ being connected as $S_1$, $X_1$, 2, 1, $B_3$ and $S_3$, $X_3$, 5, 6, $B_1$ respectively. Midway between the junction points $S_1$, $S_2$, $S_3$ and $S_4$, preferably at the central points thereof four high resistances R are connected in star.

At the initial stage of starting, the secondary current, because of its higher frequency and higher voltage, will mainly flow through the resistances R, developing a large torque and consequently a high acceleration. When a higher speed is attained and both of frequency and voltage diminish, the secondary current will mainly flow through the inductances $X_1$, $X_2$, $X_3$, $X_4$ and the compensating armature winding A. Although the compensating E. M. F. is practically constant through the whole period of acceleration, up to full speed, its compensating action is fully developed due to the gradual decline of the voltage drops at the inductances, thereby ensuring a high torque at normal speed.

As above stated, in the induction motor according to my invention, after starting almost all of the secondary current closes through the compensating circuit comprising the high inductances $X_1$, $X_2$, $X_3$, $X_4$ and the armautre winding A, and this circuit bears in addition thereto the compensating exciting current, the current in the resistances R becoming practically nil.

If desired, to eliminate the loss of the compensating voltage, the inductances X may be short circuited after starting by any suitable automatic or non-automatic means. On the other hand, the starting resistances, being of a high value, and especially when they are connected at the middle points between the points of connection of the inductances, very little current will flow through them so that they can be neglected and need not be controlled in any way. Therefore, they can be of a simple form, such as carbon rods.

To convert the motor from its normal operation into a synchronous motor, can be easily performed by bringing the motor to a speed which is slightly higher than the synchronous speed by locating the brushes at suitable positions, and then, leaving two brushes intact, which are diametrically opposite, for example $B_2$ and $B_4$, for supplying an exciting current to the stator winding, and cutting off the remaining brushes from the stator winding by way of disconnecting them at the switch W, the motor may very conveniently be synchronized. In this instance, two of the inductances $X_1$ and $X_3$ should preferably be short-circuited by themselves across the points 2, 5 (Fig. 2).

In the accompanying figures the stator winding S is shown as connected for four phase but any polyphase connection may be employed without substantial alterations in the construction.

Further in my invention when the stator winding is of quarter phase connection and is intended to be used as a synchronous motor, the cross magnetization due to the load current can very easily be compensated by using a pair of brushes, say $B_2$ and $B_4$, for the purpose of leading out the exciting current and the remaining pair $B_1$ and $B_3$ for compensating purpose. In this case either one of the pairs of brushes, say $B_1$ and $B_3$, may be reversed at the reversing switch W so as to change the sense of phase rotation of the E. M. F.'s. Then, if the brushes $B_2$ and $B_4$ serve to lead out the main exciting current, the other brushes $B_1$ and $B_3$ will serve to lead out the compensating current induced by the cross field due to the load current in the primary winding, this compensating current flowing in the stator winding S in perpendicular relation to the axis of excitation. In this manner it will be possible to keep the power factor of the machine practically constant at the unity value throughout the whole range of loading.

In the drawings, the stator winding S has been shown connected in a ring arrangement, but it will be obvious that any other well-known arrangement may be employed.

What I claim is:—

1. A compensated induction motor comprising a primary winding, a ring-connected secondary winding, a compensating winding, and star-connected high resistances connected to the said secondary winding at the junction points thereof, the said compensating winding being connected to the said secondary winding at the middle points between the said junction points through inductances sufficiently high to prevent a flow of secondary current at starting.

2. An induction synchronous machine comprising a primary winding, a quarter phase secondary winding, high starting resistances connected to the said secondary winding, a compensating winding provided adjacent to the said primary winding and connected to the said secondary winding through high inductances, and a change-over switch for changing the connection of the compensating circuit comprising the said compensating winding and inductances so as to convert the operation of the machine from that of the compensated induction machine to that of the compensated synchronous machine and vice versa.

In testimony whereof I affix my signature.

TADAOKI YAMAMOTO.